(12) United States Patent
Jones

(10) Patent No.: US 10,190,882 B2
(45) Date of Patent: Jan. 29, 2019

(54) SYSTEM AND METHOD TO FACILITATE HAVING ADEQUATE VEHICLE POWER

(71) Applicant: JAGUAR LAND ROVER LIMITED, Warwickshire (GB)

(72) Inventor: Matt Jones, Portland, OR (US)

(73) Assignee: JAGUAR LAND ROVER LIMITED, Whitley, Coventry (GB)

(*) Notice: Subject to any disclaimer, the term of this patent is extended or adjusted under 35 U.S.C. 154(b) by 0 days.

(21) Appl. No.: 14/972,451

(22) Filed: Dec. 17, 2015

(65) Prior Publication Data

US 2017/0176200 A1    Jun. 22, 2017

(51) Int. Cl.
*G01C 21/34* (2006.01)
*G01C 21/36* (2006.01)

(52) U.S. Cl.
CPC ........ *G01C 21/3469* (2013.01); *G01C 21/343* (2013.01); *G01C 21/3697* (2013.01)

(58) Field of Classification Search
CPC ............ G01C 21/3469; G01C 21/3697; G01C 21/343
See application file for complete search history.

(56) References Cited

U.S. PATENT DOCUMENTS

| | | |
|---|---|---|
| 5,790,976 A | 8/1998 | Boll et al. |
| 6,591,185 B1 | 7/2003 | Polidi et al. |
| 2010/0138093 A1* | 6/2010 | Oku ........................ B60L 11/18 701/22 |
| 2011/0288765 A1 | 11/2011 | Conway |
| 2013/0096818 A1 | 4/2013 | Vicharelli et al. |
| 2014/0025255 A1 | 1/2014 | Xiaoli |
| 2014/0052373 A1 | 2/2014 | Hoch et al. |
| 2015/0073636 A1* | 3/2015 | Machino ............ G01C 21/3469 701/22 |
| 2016/0031525 A1* | 2/2016 | Craven .................... B62J 99/00 180/206.2 |
| 2016/0362098 A1* | 12/2016 | Ogawa .................. B60W 20/12 |

FOREIGN PATENT DOCUMENTS

DE 10 2012 003292 A1 6/2013
WO 2013013730 A1 1/2013

OTHER PUBLICATIONS

Combined Search and Examination Report under Sections 17 and 18(3) for Application No. GB1612339.0 dated Jan. 13, 2017.
International Search Report and Written Opinion of the International Searching Authority for Application No. PCT/EP2016/079212 dated Feb. 21, 2017.

* cited by examiner

*Primary Examiner* — Mussa A Shaawat
*Assistant Examiner* — Michael V Kerrigan

(57) ABSTRACT

An illustrative example system includes a user interface configured to provide information to an individual in a vehicle. A controller is configured to estimate a remaining power capacity of a source of electric power that will remain after travelling along an identified route to an identified destination. The controller determines whether the estimated remaining power capacity will be sufficient for travelling from the identified destination to at least one known location where increasing the power capacity of the source is possible. The user interface provides an indication of at least one recommendation regarding increasing the power capacity of the source prior to reaching the identified destination when the estimated remaining power capacity will not be sufficient for travelling from the identified destination to the at least one known location.

26 Claims, 3 Drawing Sheets

SYSTEM AND METHOD TO FACILITATE HAVING ADEQUATE VEHICLE POWER

TECHNICAL FIELD

The present disclosure relates to providing information to facilitate having adequate electric power capacity for driving a vehicle to a location where additional power is available. Aspects of the invention relate to a system, a vehicle and a method.

BACKGROUND

With the increasing availability of electric propulsion systems on electric or hybrid vehicles, it is becoming possible to travel without relying on an internal combustion engine. One challenge, however, is that many vehicle owners do not have experience in knowing how much electrical power is needed for travelling to various destinations. Simply providing an estimate of a remaining range of travel may not be adequate because electrical power consumption rates may vary depending on the driving conditions, vehicle owner habits, and use of electrical accessories on board the vehicle.

Additionally vehicle owners may be less familiar with locations where a vehicle electrical power source can be recharged than with places where gasoline is available for purchase. While an estimated range of travel may be enough information to give a driver confidence that it is possible to reach an intended destination there is a possibility that the remaining power will be insufficient to reach another location where it is possible to recharge the vehicle power source.

Embodiments of this invention provide enhancements in informing a driver regarding having adequate electrical power for driving.

SUMMARY

Aspects and embodiments of the invention provide a system, a method and a vehicle as claimed in the appended claims.

According to an aspect of the invention, there is provided a method including: estimating a remaining power capacity of a vehicle source of electric power that will remain after travelling along an identified route to an identified destination; determining whether the estimated remaining power capacity will be sufficient for travelling from the identified destination to at least one known location where increasing the power capacity of the vehicle source of electric power is possible; and providing an indication of at least one recommendation regarding increasing the power capacity of the vehicle source of electric power prior to reaching the identified destination when the estimated remaining power capacity will not be sufficient for travelling from the identified destination to the at least one known location.

An example embodiment having one or more features of the method of the previous paragraph, includes identifying at least one recommended location where increasing the power capacity prior to reaching the identified destination is possible; and providing automated route guidance to the recommended location based on a selection by a user.

In an example embodiment having one or more features of the method of either of the previous paragraphs, the at least one recommended location is on the identified route.

In an example embodiment having one or more features of the method of any of the previous paragraphs, the at least one recommended location is near a portion of the identified route.

An embodiment having one or more features of the method of any of the previous paragraphs includes: determining an estimated remaining power capacity resulting from driving to the identified destination for each of a plurality of driving modes; determining whether any of the determined estimated remaining power capacities is sufficient for travelling from the identified destination to the at least one known location; and providing an indication to use one of the drive modes that results in an estimated remaining power capacity that is sufficient for travelling from the identified destination to the at least one known location.

In an example embodiment having one or more features of the method of any of the previous paragraphs, estimating the remaining power capacity is based on at least one characteristic of the identified route, the at least one characteristic having an impact on electrical energy use.

In an example embodiment having one or more features of the method of any of the previous paragraphs, the at least one characteristic comprises a distance to the identified destination along the identified route, and at least one of: a change in elevation along the identified route, a traffic condition along the identified route, and a weather condition along the identified route.

In an example embodiment having one or more features of the method of any of the previous paragraphs, estimating the remaining power capacity is based on power consumption information obtained during at least one previous journey along at least a portion of the identified route.

In an example embodiment having one or more features of the method of any of the previous paragraphs, providing the indication includes providing a warning that there may be insufficient power capacity after arriving at the identified destination if additional power capacity is not obtained prior to reaching the identified destination.

An embodiment having one or more features of the method of any of the previous paragraphs includes identifying the route by at least one of planning the route based on user input regarding the identified destination, and recognizing the route based on previous vehicle travels along at least a portion of the identified route.

According to another aspect of the invention, there is provided a vehicle comprising a system configured to perform the method of any of the previous paragraphs.

According to another aspect of the invention, there is provided a system that includes user interface means for providing information to an individual in a vehicle; and control means for: estimating a remaining power capacity of a vehicle source of electric power that will remain after travelling along an identified route to an identified destination; determining whether the estimated remaining power capacity will be sufficient for travelling from the identified destination to at least one known location where increasing the power capacity of the vehicle source of electric power is possible; and providing an indication of at least one recommendation regarding increasing the power capacity of the vehicle source of electric power prior to reaching the identified destination when the estimated remaining power capacity will not be sufficient for travelling from the identified destination to the at least one known location.

In an example embodiment having one or more features of the system of the previous paragraph, the user interface means includes at least one of a display screen and a speaker; and the control means includes at least one computing device and memory associated with the at least one computing device.

In an example embodiment having one or more features of the system of any of the previous paragraphs, the at least one computing device comprises a first processor configured to determine information regarding the identified route and the at least one recommend location; and a second processor configured to determine the estimated remaining power capacity.

In an example embodiment having one or more features of the system of any of the previous paragraphs, the control means is configured for identifying at least one recommended location where increasing the power capacity prior to reaching the identified destination is possible; and providing automated route guidance to the recommended location based on a selection by a user.

In an example embodiment having one or more features of the system of any of the previous paragraphs, the at least one recommended location is on the identified route.

In an example embodiment having one or more features of the system of any of the previous paragraphs, the at least one recommended location is near a portion of the identified route.

In an example embodiment having one or more features of the system of any of the previous paragraphs, the control means is configured for determining an estimated remaining power capacity for each of a plurality of driving modes; determining whether any of the determined estimated remaining power capacities is sufficient for travelling from the identified destination to the at least one known location; and providing an indication to use one of the drive modes that results in an estimated remaining power capacity that is sufficient for travelling from the identified destination to the at least one known location.

In an example embodiment having one or more features of the system of any of the previous paragraphs, the control means is configured for estimating the remaining power capacity based on at least one characteristic of the identified route, the at least one characteristic having an impact on electrical energy use.

In an example embodiment having one or more features of the system of any of the previous paragraphs, the at least one characteristic comprises a distance to the identified destination along the identified route and at least one of: a change in elevation along the identified route, a traffic condition along the identified route, and a weather condition along the identified route.

In an example embodiment having one or more features of the system of any of the previous paragraphs, the control means is configured for providing a warning that there may be insufficient power capacity after arriving at the identified destination if additional power capacity is not obtained prior to reaching the identified destination.

In an example embodiment having one or more features of the system of any of the previous paragraphs, the control means is configured for estimating the remaining power capacity based on power consumption information obtained during at least one previous journey along at least a portion of the identified route.

In an example embodiment having one or more features of the system of any of the previous paragraphs, the control means is configured for identifying the route by at least one of planning the route based on user input regarding the identified destination, and recognizing the route based on previous vehicle travels along at least a portion of the identified route.

According to another aspect of the invention, there is provided a vehicle comprising the system of any of the previous paragraphs.

According to another aspect of the invention, there is provided a system that includes a user interface including at least one of a speaker and a display. The user interface is configured to provide information to an individual in a vehicle. A controller is configured to estimate a remaining power capacity of a vehicle source of electric power that will remain after travelling along an identified route to an identified destination. The controller determines whether the estimated remaining power capacity will be sufficient for travelling from the identified destination to at least one known location where increasing the power capacity of the vehicle source of electric power is possible. The controller selectively causes the user interface to provide an indication of at least one recommendation regarding increasing the power capacity of the vehicle source of electric power prior to reaching the identified destination when the estimated remaining power capacity will not be sufficient for travelling from the identified destination to the at least one known location.

Within the scope of this document it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Embodiments of this invention provide information to assist a vehicle owner to have adequate power for driving a vehicle.

Figure 1:
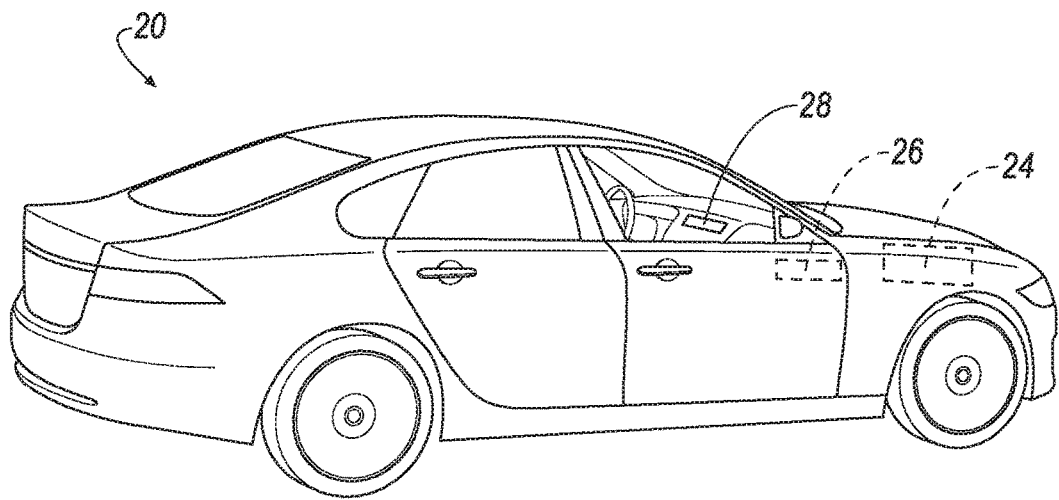
FIG. 1 diagrammatically illustrates an example embodiment of a system designed according to an embodiment of this invention associated with a vehicle.
Figure 2:
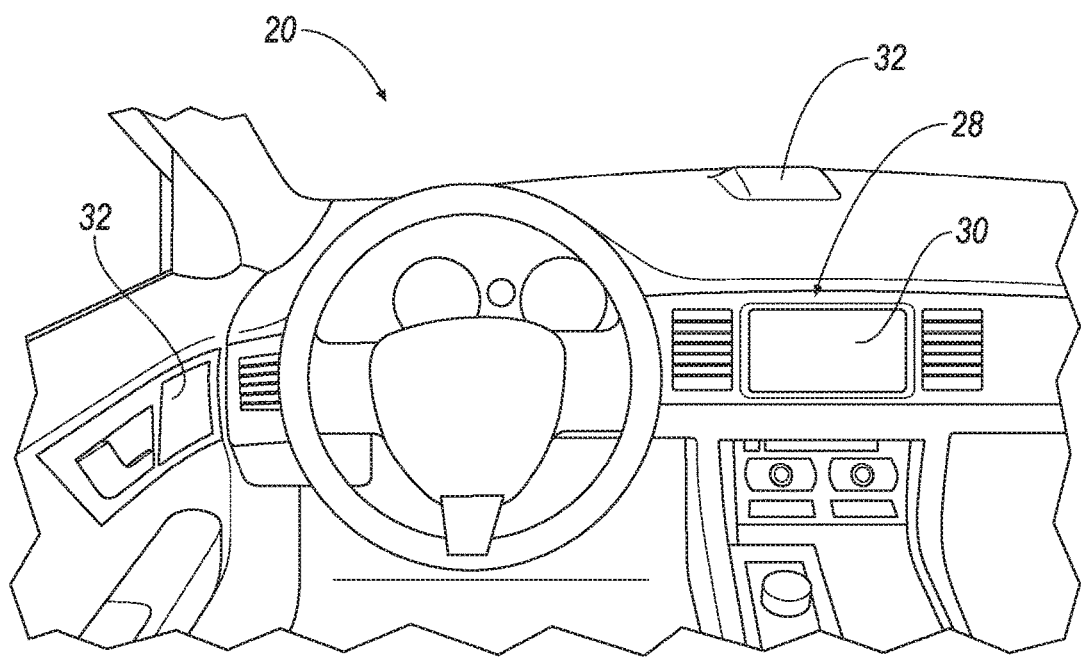
FIG. 2 diagrammatically illustrates selected portions of the example system situated in the interior of the example vehicle.
Figure 3:
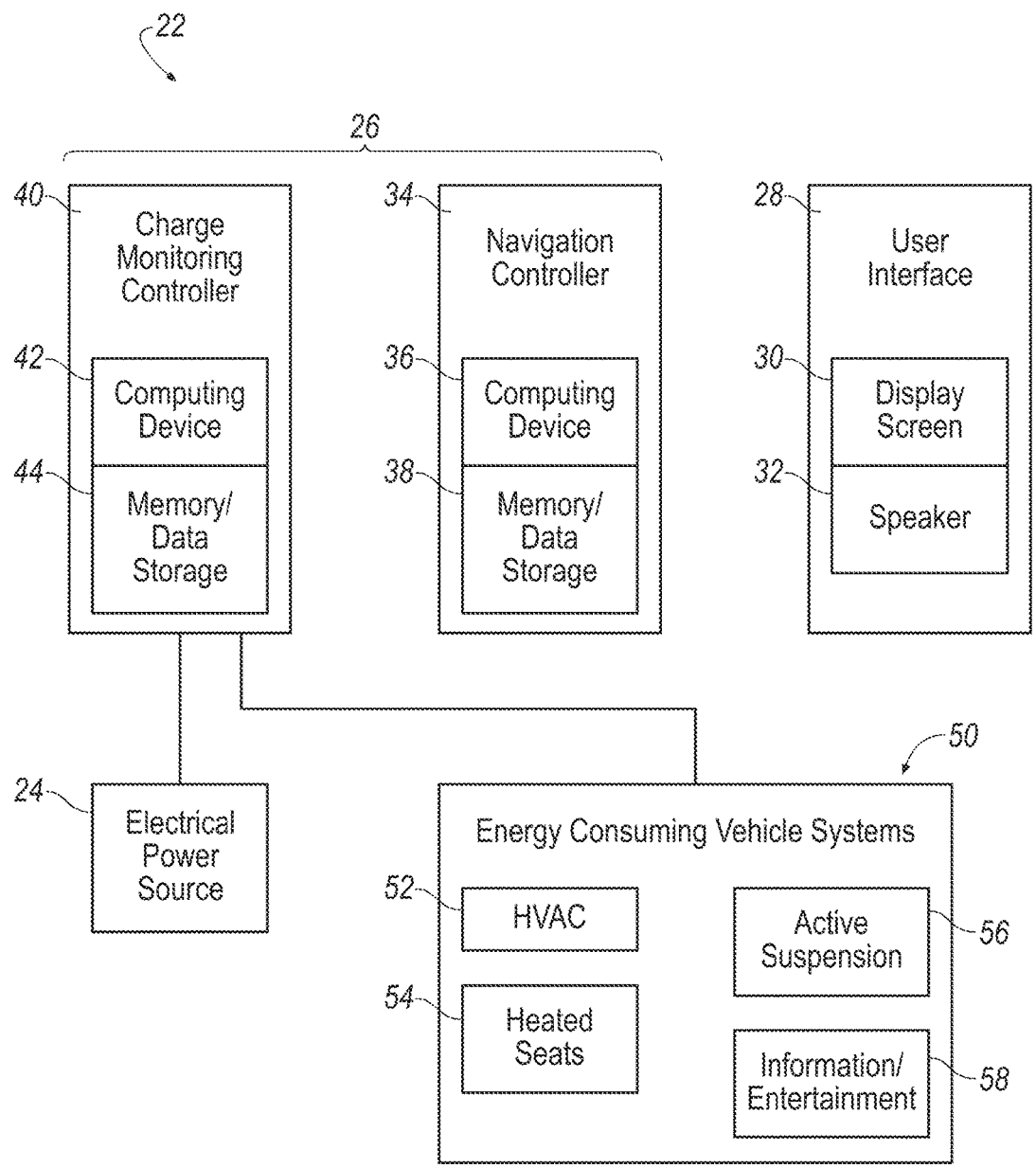
FIG. 3 schematically illustrates selected portions of a system designed according to an embodiment of this invention.

FIGS. 1-3 illustrate a vehicle 20 having an associated system 22 that facilitates providing information to a driver so that the power capacity of a source 24 of electrical power for the vehicle 20 will be adequate to reach a location where additional power is available. The system 22 includes a control means 26 and a user interface means 28. In the illustrated example, the user interface means 28 includes a display screen 30 that provides visible information to an individual within the vehicle 20. The user interface means 28 in this example also includes at least one speaker 32 that provides audible information to an individual in the vehicle 20. The user interface means 28 is also capable of receiving information from an individual within the vehicle based on at least one input device, such as a microphone (not illustrated), a touch pad or control switch (not illustrated) or use of the display screen 30 when the embodiment includes a touch screen.

The control means 26 in this example includes at least one computing device or processor and associated data storage or memory. As shown in FIG. 3, the illustrated example includes a navigation controller 34 comprising a processor or computing device 36 and associated memory 38. The navigation controller 34 is programmed or otherwise configured to use known techniques for providing route guidance or navigation information to a driver of the vehicle 20.

The control means 26 in this example also includes a power monitor controller 40 that includes a computing device 42 and memory 44. The power monitor controller 40 is programmed or otherwise configured to make determinations regarding at least a current power capacity of the electrical power source 24, an amount of electrical power necessary for propelling the vehicle to a selected or expected destination along a planned or current route based in part on information from the navigation controller 34, and to determine whether sufficient power capacity will remain after reaching the expected destination to travel to another location where it is possible to increase the power capacity of the source 24.

Some embodiments will include discrete components for the navigation controller 34 and the power monitor controller 40, respectively, as schematically shown in FIG. 3. Other embodiments will include a single device as the controller that is configured to perform the different functions described as being performed by one of the respective controllers within this description. In a similar manner, some embodiments will have discrete devices used for the memory 38 and 44, respectively, while other embodiments will utilize a single memory. In some embodiments the memory is at least partially provided or maintained by a service provider at a remote location and information in such memory is available to the controllers on board the vehicle through known data communication techniques. Given this description, those skilled in the art will realize what devices, hardware, software, firmware or combination of these will best meet the needs of their particular situation.

The navigation controller 34 determines information regarding an intended or expected route of the vehicle 20. In some instances, a driver selects a destination and the navigation controller 34 calculates a route to provide navigation guidance to the driver. Under such circumstances, the navigation controller identifies the intended route because it has calculated it before or during the journey.

In some embodiments, the navigation controller 34 is programmed or otherwise configured to estimate a route of a current vehicle journey based upon previous travels of the vehicle 20. For example, a vehicle owner typically follows a common route on the way to a place of business or employment several days a week. The navigation controller 34 in such an embodiment utilizes information from a global positioning system to track or record such route information and associate that with a time of day, for example. Such information may be stored in the memory 38 or uploaded to a storage maintained by a third party so that it is subsequently available to the navigation controller 34. During a subsequent journey, if the current location of the vehicle, the trajectory and time of day correspond to a previously learned and stored route, the control means 26 may identify such a route as the current route of the vehicle 20 even if the driver does not utilize the navigation system for guidance. The navigation controller 34 in some embodiments also has the capability to utilize other information to obtain or generate route information to identify a route and to later recognize a previously taken and identified route.

The power monitor controller 40 is configured to dynamically update information regarding a remaining power capacity or a remaining amount of power available from the electrical power source 24. Power capacity may be measured or quantified in different ways depending on the particular power source. For example, a battery capacity may be expressed in terms of charge while a fuel cell capacity may be expressed in terms of available reactants or fuel. For purposes of discussion in the remainder of this description, the electrical power source 24 is assumed to be a rechargeable device, such as a battery, but embodiments of this invention are not necessarily limited to any particular power source configuration. A variety of electrical power sources may be utilized to provide power necessary for propelling the vehicle 20.

As shown in FIG. 3, the power monitor controller 40 also utilizes information regarding a plurality of energy consuming vehicle systems schematically shown at 50. For discussion purposes and by way of example, energy consuming vehicle systems such as the heating, ventilation and air conditioning system (HVAC) 52, heated seats 54, active suspension 56, and information or entertainment system 58, utilize electrical power that may come from the electrical power source 24.

Figure 4:
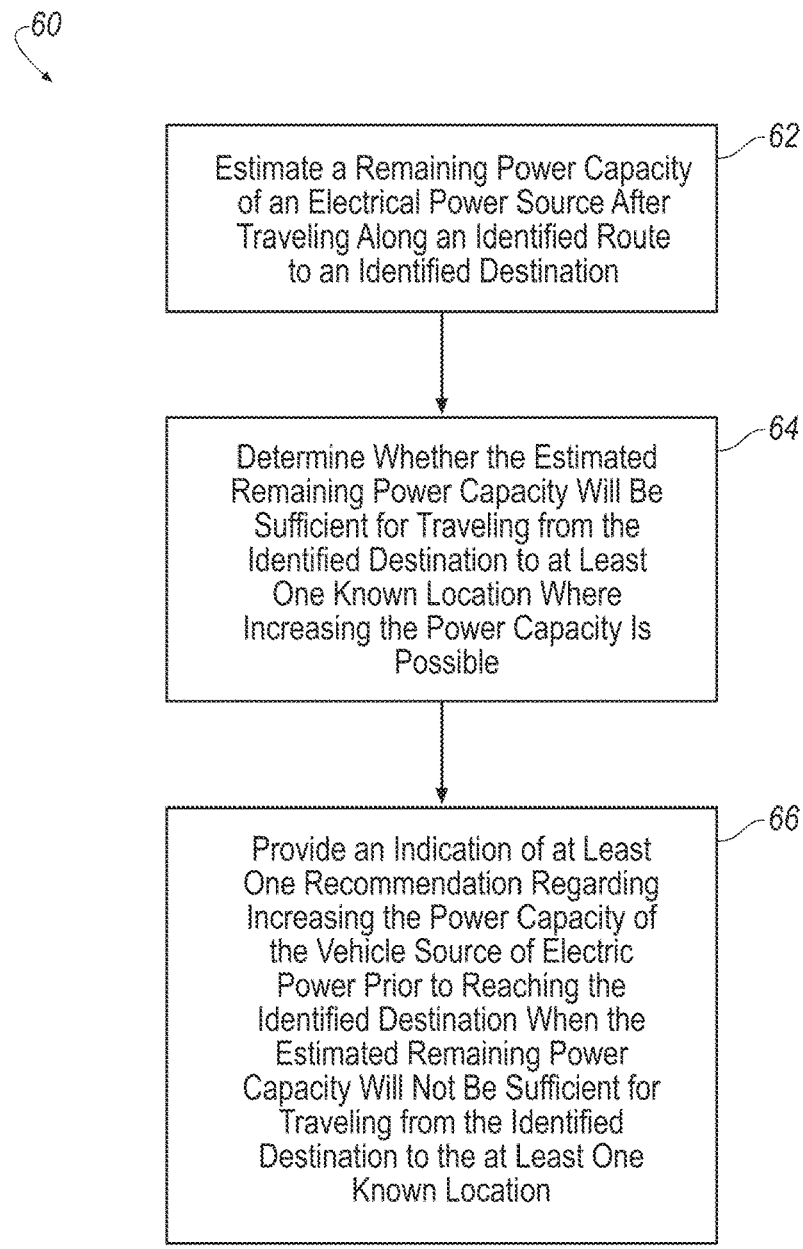
FIG. 4 is a flow chart diagram that summarizes an example method of assisting a vehicle owner so that adequate power is available to drive a vehicle.

The control means 26 facilitates providing information for driving the vehicle 20 in a manner that accounts for locations of available power to replenish the power capacity of the power source 24 to avoid the vehicle 20 being without adequate power to reach such a location. FIG. 4 includes a flow chart diagram 60 that summarizes an example approach.

At 62 the control means 26 determines an estimated remaining power capacity of the vehicle source of electric power 24 that will remain after travelling along an identified route to an identified destination. As mentioned above, the route may be identified based on navigation system inputs from the driver or by recognizing that the vehicle is following a previously stored route. The destination may be selected by the driver or may be selected by the navigation controller if the route is recognized from information regarding previously analyzed and stored routes.

Regardless of how the control means 26 determines the current route, the control means 26 determines the remaining power capacity of the electric power source 24 based on the actual route that the vehicle 20 will follow to the identified destination. At least one characteristic associated with the vehicle 20 traveling along that route is taken into account for purposes of determining the remaining power capacity. There are a variety of characteristics that have an effect on electrical power use and at least one of them is utilized by the control means 26 for the determination at 62.

Example characteristics that affect how a remaining charge level of the electric power source 24 will be consumed include characteristics that affect propulsion or other ways in which systems on the vehicle consume electrical power. For example, if a portion of the route involves various or significant elevation or grade changes that affects how much acceleration is required and how much regenerative braking may be available. Elevation or grade information is known within many navigation databases or from various sources through the Internet and can be obtained by the control means 26 in a known manner (e.g., using known wireless data communication techniques). Traffic conditions are another example characteristic that may have an effect on energy use. Such information may be obtained in a periodic or ongoing basis, for example, from a publicly available source over the Internet. The total or remaining distance along the identified route also may have an effect on the remaining charge level. Weather conditions are another characteristic that may affect energy usage along the identified route. For example, the ambient temperature impacts how much the driver will utilize the HVAC system 52. Additionally, information regarding the current operating conditions of the energy consuming vehicle systems 50 has an effect on the remaining charge level. Expected use of vehicle accessories or on board systems 50, which may be based on current settings or previously monitored driver habits, is considered in some embodiments. According to the illustrated embodiment, at least one such characteristic is taken into account when determining the remaining charge level at 62. In one embodiment the distance along the route is considered along with at least one other characteristic.

The remaining power may be determined at least in part based on actual power consumption information from previous travels along the identified route. Some example control means 26 are configured to monitor power consumption under various driving conditions and to store such information for use in subsequent determinations of remaining power capacity. For example, the power consumed during previous trips along portions of an identified route provides a reliable indication of how much power will be used during the current journey. Such information may be stored by the control means 26 in local memory 38 on board the vehicle. In some embodiments, information obtained from multiple vehicles is stored in a database that is maintained as part of an information service. The stored information may correspond to an entire identified journey or portions of it. When such information is stored at a remote location it is possible for a service provider to gather such information from a variety of vehicles and to provide aggregated or averaged energy use information for various routes to a variety of vehicles having a system 22. In some embodiments the control means 26 accesses previous energy use information for at least a portion of the identified route and uses that information to determine the expected energy use on the current trip.

At 64, the control means 26 determines whether the estimated remaining power capacity will be sufficient for travelling from the identified destination to at least one known location, such as a recharging station or the vehicle owner's home, where increasing the power capacity of the power source 24 is possible. The determination at 64 involves obtaining information regarding at least one location where additional power is available, determining at least a distance between any such location and the identified destination, and determining the amount of power needed for at least one route between the identified destination and the recharging station location. Determining the amount of power needed is based on the same type of information as used to determine the remaining power at 62.

The locations where additional power is available may be determined based on information available over the Internet, information from a service provider, or information determined by the control means 26 based on a previous visit to a charging station, for example. In some examples, the control means 26 identifies a location where additional power is available based on the navigation controller 34 identifying a location during a previous battery recharge and storing such information in the memory 38. In some examples, such information is obtained by various vehicle systems that respectively upload such information to a database provider that makes such information available to other vehicle systems.

The location or locations where additional power is available that are considered by the control means 26 may be limited to those within a predetermined range of the identified destination to reduce the amount of processing required to make the determination at 64. For similar reasons the number of candidate locations where additional charge is available may be limited. Some embodiments include identifying the location of the recharging station that is closest to the identified destination and at least one alternative location.

At 66, the user interface means 28 provides an indication of at least one recommendation regarding increasing the power capacity of the power source 24 prior to reaching the identified destination when the estimated remaining power capacity will not be sufficient for travelling from the identified destination to the at least one known location. The recommendation may take several forms.

In one example, the recommendation includes at least a notification to the driver that not recharging before reaching the identified destination may or will result in insufficient power to reach the location of a recharging station. Some recommendations include suggested recharging stations along the current route or nearby a portion of the route. Other indications provided at 66 include route guidance to a recharging station as an intermediate stop along the route to the identified destination.

Providing the indication at 66 assists the driver in avoiding becoming stranded with insufficient electrical power to drive to a location where additional charge is available for the power source 24. The information regarding the remaining charge and the charge needed to reach a location where additional charge is available are based on route information that is more detailed and precise than just a distance of travel and that yields more useful information for a driver than just an expected potential range of travel.

In some embodiments, the control means 26 will take action to reduce power consumption on the way to the identified destination to maximize the remaining power under at least some circumstances. One way in which the control means 26 may control the use of electrical power on the vehicle to preserve enough power capacity for eventually reaching a location where the power capacity can be increased is to automatically adjust operation of at least one of the vehicle systems 50 to reduce the amount of electrical power used by such a system. For example, under conditions in which the remaining power capacity is not much above the power capacity needed to reach a recharging station, the power monitor controller 40 obtains information regarding the energy consuming vehicle systems 50 and determines which of those may be turned off or turned down in some manner to conserve electrical power. For example, the heated seats 54 may be turned off or a feature of the information or entertainment system 58 may be altered to reduce energy consumption (e.g., a display screen may be dimmed or turned off). Depending on a determination regarding outdoor temperature and the temperature of the interior of the vehicle 20, the HVAC system 52 may be controlled automatically to reduce an amount of energy consumption by that system.

One feature of the example control means 26 is that it allows for a driver or another individual in the vehicle to override any automatic adjustment or control over the energy consuming vehicle systems 50. The control means 26 in such an embodiment monitors such actions by a driver (or another individual) for purposes of learning a driver's preferences regarding which of the systems 50 may be automatically adjusted or an order in which those systems should be prioritized for adjustment when energy savings are desired. For example, a vehicle owner may not mind an information or entertainment display screen being turned off but may have a strong preference for a particular vehicle temperature. Under those conditions, the control means 26 will learn over time that adjusting the operation of such a display screen is preferred by the vehicle owner over making an adjustment to the HVAC system 52. Utilizing such information and controlling the systems 50 accordingly increases the satisfaction and reduces inconvenience to the vehicle owner while still obtaining energy savings when the available charge from the power source 24 is at a level that makes it at least somewhat questionable whether reaching a location where additional power is possible.

Some example embodiments will provide an indication through the user interface means 28 regarding the automated control over the energy consuming systems 50 to alleviate any suspicion that the affected system is potentially malfunctioning. Additionally, some systems 22 will provide an indication to the driver that an override of the automated control is possible with a warning that such an override may result in insufficient power for eventually reaching a recharging station.

In the illustrated embodiment the control means 26 recognizes when the driver overrides any automated adjustment to the power consuming systems 50 and causes the user interface means 28 to provide an indication to the driver of the potential consequences of the override. For example, the display screen 30 may show a warning that the charge level will be insufficient to reach a recharge station if energy is not saved by allowing the automated control over the energy consuming system to continue.

Another potential energy saving feature of the example embodiment includes suggesting an alternate route to the identified destination. Given information, such as that described above, that affects how much power is consumed along a route, the control means 26 determines at least one alternative route to the identified destination that is expected to involve consuming less electrical power along the way.

Another feature of the illustrated embodiment includes determining whether an alternative driving mode will increase the likelihood of having sufficient remaining power capacity to reach a location where additional power is available after travelling to the identified destination. The control means 26 determines a remaining power capacity for each of a plurality of driving modes (e.g., economy or sport) and compares such remaining power capacities with that which is expected based on a current driving mode. If any of the other remaining power capacities is greater than the currently expected remaining power capacity, the control means 26 provides an indication or recommendation to switch to the driving mode that will provide more or sufficient remaining power. If more than one mode will provide that benefit, the driver may be presented with options to select one of those modes. In some embodiments, the control means 26 will automatically change the driving mode based on such a determination and provide an indication regarding the switch. In some embodiments the driver will have the ability to override the switch made by the control means 26.

The preceding description is illustrative rather than limiting in nature. Variations and modifications to the disclosed examples may become apparent to those skilled in the art that do not necessarily depart from the essence of the contribution to the art provided by the disclosed embodiments. The scope of legal protection can only be determined by studying the following claims.

I claim:

1. A method, comprising:
    determining an estimated remaining power capacity of a vehicle source of electric power that will remain after travelling along an identified route to an identified destination for each of a plurality of driving modes including a current driving mode;
    determining whether any of the estimated remaining power capacities will be sufficient for travelling from the identified destination to at least one known location where increasing the power capacity of the vehicle source of electric power is possible; and
    providing an indication of at least one recommendation regarding the remaining power capacity of the vehicle source of electric power prior to reaching the identified destination when the estimated remaining power capacity for the current driving mode will not be sufficient for travelling from the identified destination to the at least one known location, the at least one recommendation including an indication prompting a driver to use one of the plurality of drive modes different from the current driving mode that results in an estimated remaining power capacity that is sufficient for travelling from the identified destination to the at least one known location.

2. The method of claim 1, comprising
    identifying at least one recommended location where increasing the power capacity prior to reaching the identified destination is possible; and
    providing automated route guidance to the recommended location based on a selection by a user.

3. The method of claim 2, wherein the at least one recommended location is on the identified route.

4. The method of claim 2, wherein the at least one recommended location is near a portion of the identified route.

5. The method of claim 1, wherein estimating the remaining power capacity is based on at least one characteristic of the identified route, the at least one characteristic having an impact on electrical energy use.

6. The method of claim 5, wherein the at least one characteristic comprises
    a distance to the identified destination along the identified route, and
    at least one of:
    a change in elevation along the identified route,
    a traffic condition along the identified route, and
    a weather condition along the identified route.

7. The method of claim 1, wherein estimating the remaining power capacity is based on power consumption information obtained during at least one previous journey along at least a portion of the identified route.

8. The method of claim 1, wherein providing the indication includes providing a warning that there may be insufficient power capacity to travel to the at least one known location after arriving at the identified destination if additional power capacity is not obtained prior to reaching the identified destination.

9. The method of claim 1, wherein the plurality of driving modes includes at least a sport mode and an economy mode.

10. The method of claim 1, further comprising the step of identifying the route by recognizing the route based on previous vehicle travels along at least a portion of the identified route.

11. A vehicle comprising a system configured to perform the method of claim 1.

12. A system, comprising:
user interface means for providing information to an individual in a vehicle; and
control means for
determining an estimated remaining power capacity of a vehicle source of electric power that will remain after travelling along an identified route to an identified destination for each of a plurality of driving modes including a current driving mode;
determining whether any of the estimated remaining power capacities will be sufficient for travelling from the identified destination to at least one known location where increasing the power capacity of the vehicle source of electric power is possible; and
providing an indication of at least one recommendation regarding the remaining power capacity of the vehicle source of electric power prior to reaching the identified destination when the estimated remaining power capacity for the current driving mode will not be sufficient for travelling from the identified destination to the at least one known location, the at least one recommendation including an indication prompting a driver to use one of the plurality of drive modes different from the current driving mode that results in an estimated remaining power capacity that is sufficient for travelling from the identified destination to the at least one known location.

13. The system of claim 12, wherein
the user interface means includes at least one of a display screen and a speaker; and
the control means includes at least one computing device and memory associated with the at least one computing device.

14. The system of claim 13, wherein the at least one computing device comprises
a first processor configured to determine information regarding the identified route and the at least one known location; and
a second processor configured to determine the estimated remaining power capacity.

15. The system of claim 12, wherein the control means is configured for
identifying at least one recommended location where increasing the power capacity prior to reaching the identified destination is possible; and
providing automated route guidance to the recommended location based on a selection by a user.

16. The system of claim 15, wherein the at least one recommended location is on the identified route or near a portion of the identified route.

17. The system of claim 12, wherein the control means is configured for estimating the remaining power capacity based on at least one characteristic of the identified route, the at least one characteristic having an impact on electrical energy use.

18. The system of claim 17, wherein the at least one characteristic comprises
a distance to the identified destination along the identified route and
at least one of:
a change in elevation along the identified route,
a traffic condition along the identified route, and
a weather condition along the identified route.

19. The system of claim 12, wherein the control means is configured for providing a warning that there may be insufficient power capacity to travel to the at least one known location after arriving at the identified destination if additional power capacity is not obtained prior to reaching the identified destination.

20. The system of claim 12, wherein the control means is configured for estimating the remaining power capacity based on power consumption information obtained during at least one previous journey along at least a portion of the identified route.

21. The system of claim 20, wherein a current location of the vehicle, a trajectory, and a time of day for the identified route correspond to the previous journey.

22. The system of claim 12, wherein the plurality of driving modes includes at least a sport mode and an economy mode.

23. The system of claim 12, wherein the control means is configured for identifying the route by recognizing the route based on previous vehicle travels along at least a portion of the identified route.

24. The system of claim 14, wherein the control means is configured to determine a preference of the individual in response to the individual's override of any automatic control of an energy consuming vehicle system.

25. A vehicle comprising the system of claim 12.

26. A system, comprising:
a user interface including at least one of a display and a speaker, the user interface providing information to an individual in a vehicle; and
at least one processor that is configured to
determine an estimated remaining power capacity of a vehicle source of electric power that will remain after travelling along an identified route to an identified destination for each of a plurality of driving modes including a current driving mode;
determine whether any of the estimated remaining power capacities will be sufficient for travelling from the identified destination to at least one known location where increasing the power capacity of the vehicle source of electric power is possible; and
provide an indication of at least one recommendation regarding the remaining power capacity of the vehicle source of electric power prior to reaching the identified destination when the estimated remaining power capacity for the current driving mode will not be sufficient for travelling from the identified destination to the at least one known location, the at least one recommendation including an indication prompting a driver to use one of the plurality of drive modes different from the current driving mode that results in an estimated remaining power capacity that is sufficient for travelling from the identified destination to the at least one known location;
wherein the processor is configured for identifying the route by recognizing the route based on previous vehicle travels along at least a portion of the identified route.

* * * * *